(12) United States Patent
Jesionowski et al.

(10) Patent No.: US 11,194,738 B2
(45) Date of Patent: Dec. 7, 2021

(54) IMPLEMENTING MANAGEMENT COMMANDS UTILIZING AN IN-BAND INTERFACE

(71) Applicant: International Business Machines Corporation, Armonk, NY (US)

(72) Inventors: Lee Jesionowski, Tucson, AZ (US); Jason L. Peipelman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/525,297

(22) Filed: Jul. 29, 2019

(65) Prior Publication Data

US 2021/0034548 A1    Feb. 4, 2021

(51) Int. Cl.
*G06F 3/00*     (2006.01)
*G06F 13/10*    (2006.01)
*G06F 13/42*    (2006.01)

(52) U.S. Cl.
CPC ........ *G06F 13/102* (2013.01); *G06F 13/4221* (2013.01); *G06F 2213/0028* (2013.01)

(58) Field of Classification Search
CPC .................................................. G06F 13/102
See application file for complete search history.

(56) References Cited

U.S. PATENT DOCUMENTS

| | | | |
|---|---|---|---|
| 5,895,493 A * | 4/1999 | Gatica ................... | G06F 3/0634 711/147 |
| 6,018,779 A * | 1/2000 | Blumenau ............. | G06F 13/387 710/6 |
| 6,209,023 B1 * | 3/2001 | Dimitroff .............. | G06F 3/0607 709/211 |
| 9,639,546 B1 * | 5/2017 | Gorski .................. | G06F 16/172 |
| 9,736,231 B1 | 8/2017 | Abrams et al. | |
| 9,736,233 B2 | 8/2017 | Yamada | |
| 9,898,393 B2 | 2/2018 | Moorthi et al. | |
| 2004/0148460 A1 * | 7/2004 | Steinmetz ............. | G06F 3/0607 711/114 |
| 2004/0162932 A1 * | 8/2004 | Mizushima ............ | G06F 21/77 711/103 |
| 2008/0244610 A1 * | 10/2008 | Zhang .............. | G06Q 10/06311 718/104 |
| 2011/0145474 A1 * | 6/2011 | Intrater ................ | G06F 13/385 711/103 |
| 2013/0339600 A1 * | 12/2013 | Shah ................... | H04L 67/1097 711/114 |
| 2017/0102885 A1 | 4/2017 | Lenox | |

(Continued)

OTHER PUBLICATIONS

Seagate, SCSI Commands Reference Manual, Oct. 2016, pp. 1-2, 46-67 (Year: 2016).*

(Continued)

*Primary Examiner* — Henry Tsai
*Assistant Examiner* — Dean Phan
(74) *Attorney, Agent, or Firm* — Zilka-Kotab, P.C.

(57) ABSTRACT

A computer-implemented method according to one embodiment includes receiving, at a peripheral device via an in-band interface, a predetermined command; determining, by the peripheral device, a predetermined identifier within the predetermined command; and implementing, by the peripheral device, parameter data associated with the predetermined identifier, in response to the determining.

20 Claims, 5 Drawing Sheets

(56) References Cited

U.S. PATENT DOCUMENTS

| | | | | |
|---|---|---|---|---|
| 2018/0109421 A1* | 4/2018 | Laribi | ................. | H04L 41/0843 |
| 2018/0364935 A1* | 12/2018 | Sundrani | ............... | G06F 3/0604 |
| 2019/0058713 A1* | 2/2019 | Pala | ..................... | H04L 63/105 |
| 2019/0332321 A1* | 10/2019 | Chen | .................... | G06F 3/0604 |

OTHER PUBLICATIONS

Seagate, "SCSI Commands Reference Manual," Seagate Technology LLC., Publication No. 100293068, Rev. K, Dec. 2017, pp. 1-518.

IBM, "Method for Timing SCSI Commands Based Upon Expected Command Execution Time," IP.com Prior Art Database, Technical Disclosure No. IPCOM000103783D, Mar. 18, 2005, 2 pages.

Anonymous, "Fast SCSI Command," IP.com Prior Art Database, Technical Disclosure No. IPCOM000203054D, Jan. 17, 2011, 4 pages.

Anonymous, "Async Command Interface to the Adapter (Virtual Host Command Register (vHCR) Algorithm)," IP.com Prior Art Database, Technical Disclosure No. IPCOM000249066D, Jan. 31, 2017, 5 pages.

\* cited by examiner

IMPLEMENTING MANAGEMENT COMMANDS UTILIZING AN IN-BAND INTERFACE

BACKGROUND

The present invention relates to device connectivity, and more specifically, this invention relates to managing peripheral devices utilizing an in-band interface.

Small computer system interface (SCSI) commands are commonly used to perform read and writes with numerous SCSI devices (such as storage products) via an in-band interface. In order to manage such SCSI devices, an out-of-band interface (such a TCP/IP interface) is commonly used. However, there is currently no method to implement a modern management API for SCSI devices via SCSI commands over an in-band interface.

SUMMARY

A computer-implemented method according to one embodiment includes receiving, at a peripheral device via an in-band interface, a predetermined command; determining, by the peripheral device, a predetermined identifier within the predetermined command; and implementing, by the peripheral device, parameter data associated with the predetermined identifier, in response to the determining.

According to another embodiment, a computer program product for implementing management commands utilizing an in-band interface includes a computer readable storage medium having program instructions embodied therewith, where the computer readable storage medium is not a transitory signal per se, and where the program instructions are executable by a processor to cause the processor to perform a method including receiving, by the processor at a peripheral device via the in-band interface, a predetermined command; determining, by the peripheral device utilizing the processor, a predetermined identifier within the predetermined command; and implementing, by the peripheral device utilizing the processor, parameter data associated with the predetermined identifier, in response to the determining.

According to another embodiment, a system includes a processor; and logic integrated with the processor, executable by the processor, or integrated with and executable by the processor, where the logic is configured to receive, at a peripheral device via an in-band interface, a predetermined command; determine, by the peripheral device, a predetermined identifier within the predetermined command; and implement, by the peripheral device, parameter data associated with the predetermined identifier, in response to the determining.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing management commands utilizing an in-band interface.

In one general embodiment, a computer-implemented method includes receiving, at a peripheral device via an in-band interface, a predetermined command; determining, by the peripheral device, a predetermined identifier within the predetermined command; and implementing, by the peripheral device, parameter data associated with the predetermined identifier, in response to the determining.

In another general embodiment, a computer program product for implementing management commands utilizing an in-band interface includes a computer readable storage medium having program instructions embodied therewith, where the computer readable storage medium is not a transitory signal per se, and where the program instructions are executable by a processor to cause the processor to perform a method including receiving, by the processor at a peripheral device via the in-band interface, a predetermined command; determining, by the peripheral device utilizing the processor, a predetermined identifier within the predetermined command; and implementing, by the peripheral device utilizing the processor, parameter data associated with the predetermined identifier, in response to the determining.

In another general embodiment, a system includes a processor; and logic integrated with the processor, executable by the processor, or integrated with and executable by the processor, where the logic is configured to receive, at a peripheral device via an in-band interface, a predetermined command; determine, by the peripheral device, a predetermined identifier within the predetermined command; and implement, by the peripheral device, parameter data associated with the predetermined identifier, in response to the determining.

Figure 1:
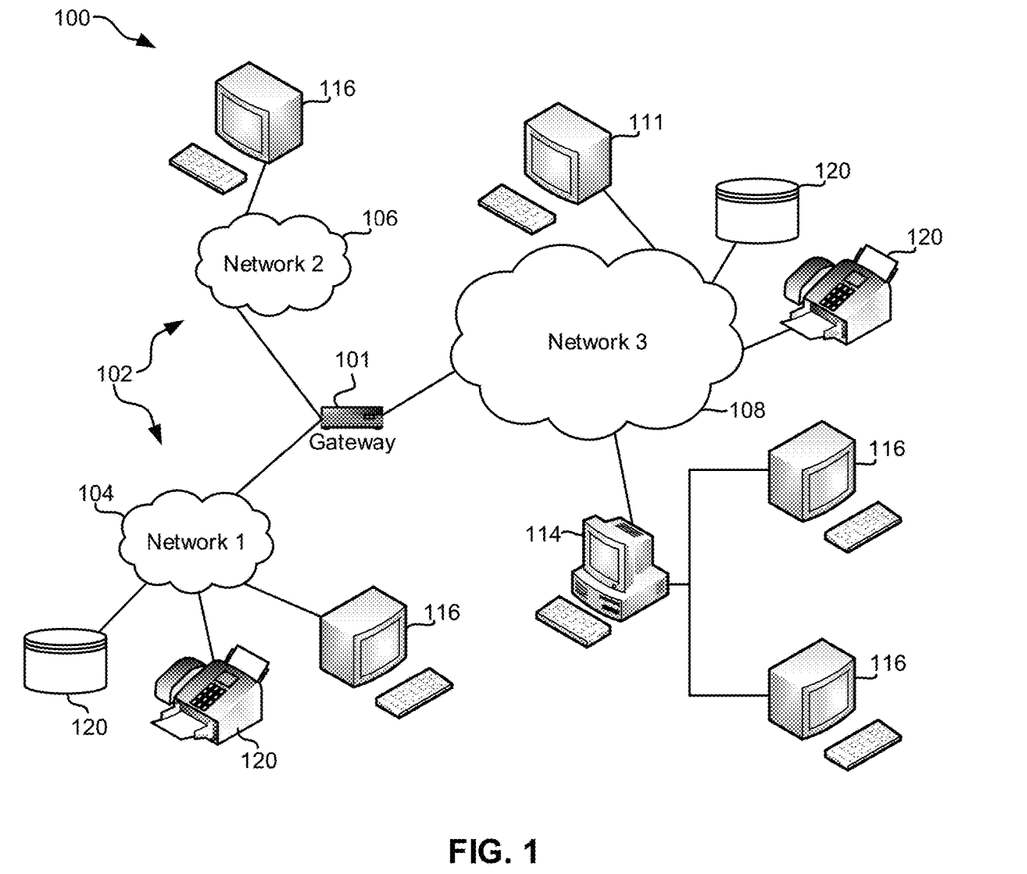
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
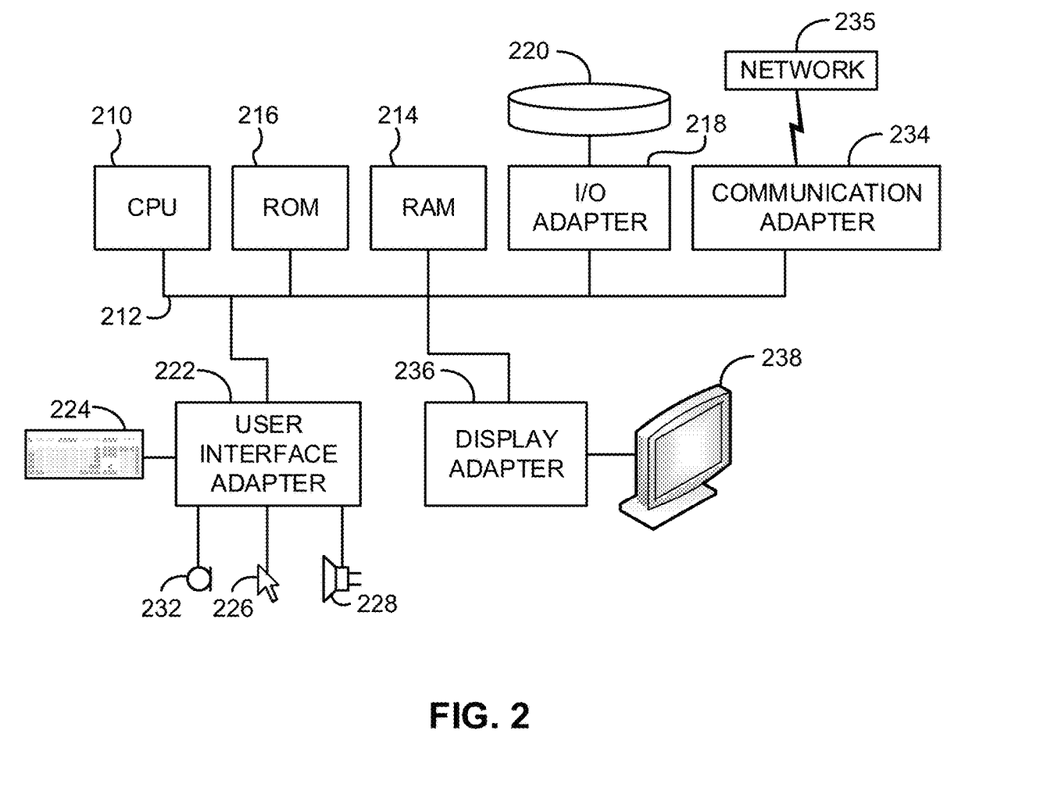
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
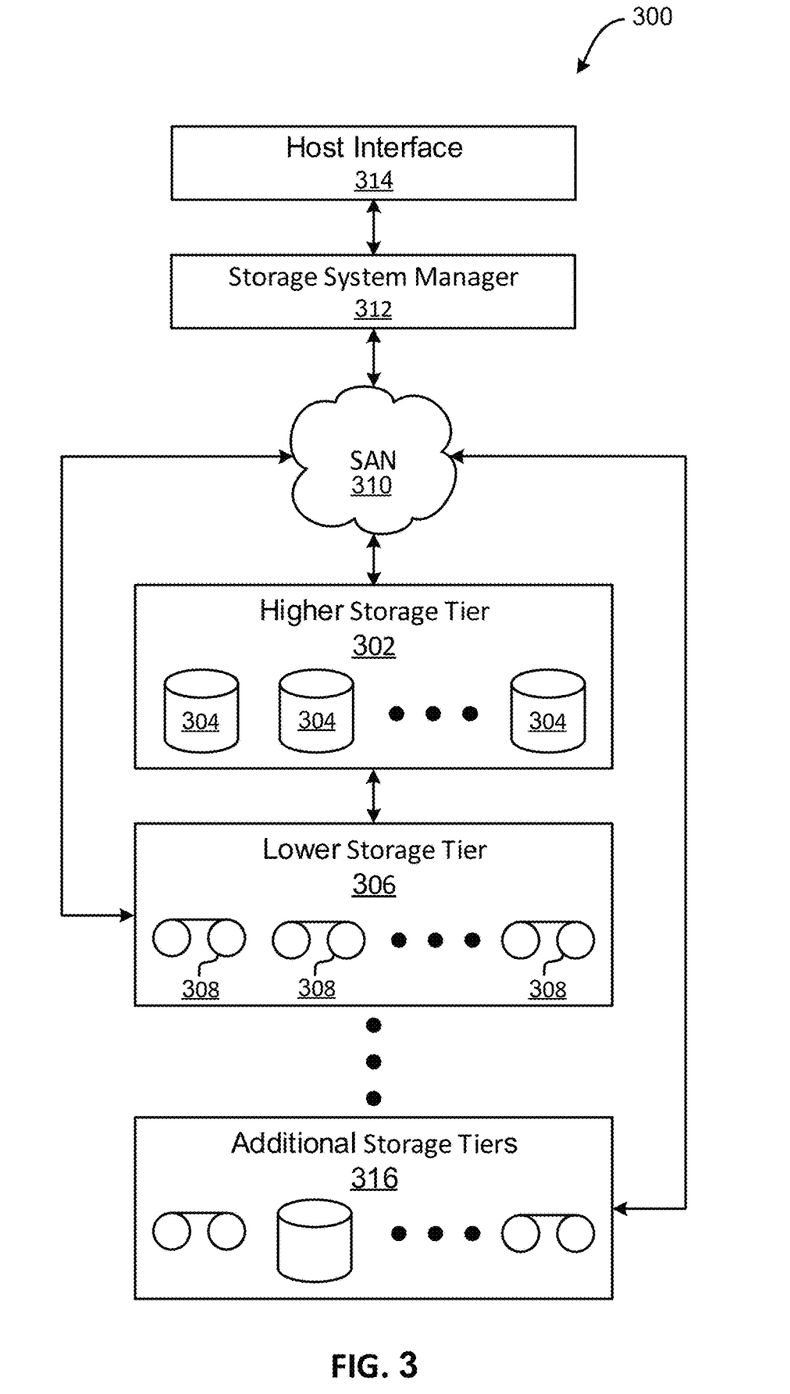
FIG. 3 illustrates a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
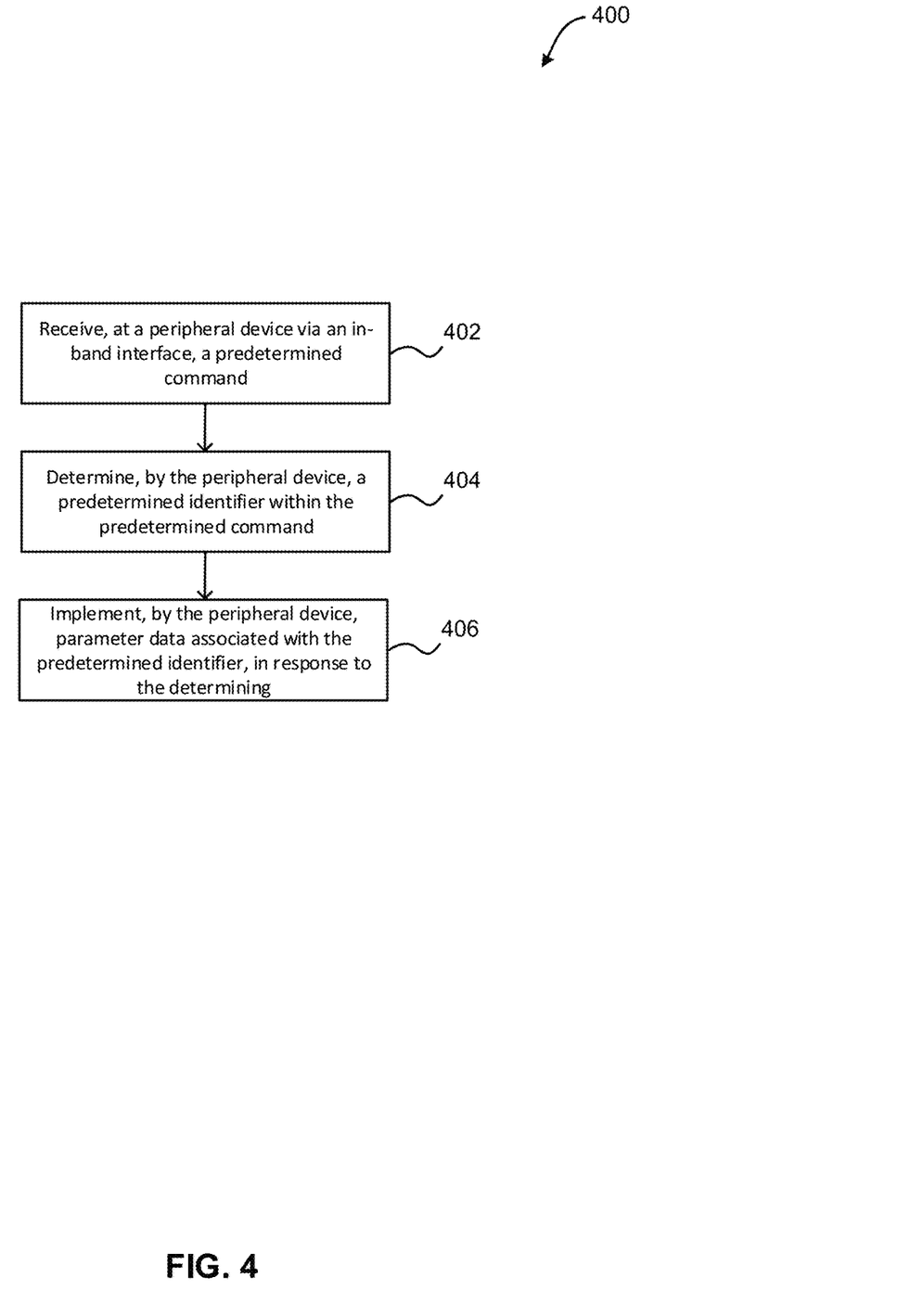
FIG. 4 illustrates a method for implementing management commands utilizing an in-band interface, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a predetermined command is received at a peripheral device via an in-band interface. In one embodiment, the predetermined command may be received from a computing device separate from the peripheral device. For example, the computing device may include one or more of a server, a node of a distributed computing environment, a desktop computer, etc.

Additionally, in one embodiment, the peripheral device may include a data storage device (e.g., a hard disk drive, a tape drive, a solid-state drive, a flash drive, etc.). In another embodiment, the in-band interface may include a predetermined transport layer (e.g., a fiber channel transport layer, a serial attached SCSI (SAS) transport layer, etc. In still another embodiment, the in-band interface may utilize a small computer system interface (SCSI) command set. For example, the predetermined command may be created utilizing the SCSI command set.

Further, in one embodiment, the in-band interface may be different from an out-of-band interface. For example, the out-of-band interface may include a transport layer different from the transport layer utilized by the in-band interface (e.g., an ethernet channel transport layer, etc.). In another embodiment, the in-band interface may utilize a first port of the peripheral device, and the out-of-band interface may utilize a second port of the peripheral device that is separate from the first port.

Further still, in one embodiment, both the in-band interface and the out-of-band interface may utilize the same port within the peripheral device. In another embodiment, the predetermined command may include a write buffer command (e.g., a SCSI write buffer command). For example, the write buffer command may include a command to write data to the peripheral device.

Also, in one embodiment, the predetermined command may include a read buffer command (e.g., a SCSI read buffer command). For example, the read buffer command may include a command to read data from the peripheral device. In another embodiment, the predetermined command may include a mode sense command, a mode select command, a log sense command, a log select command, etc.

In addition, in one embodiment, the predetermined command may have a predetermined format. For example, the predetermined command may be received by the peripheral device as a command descriptor block (CDB). In another example, the predetermined command may be created in binary within the CDB. In another embodiment, the predetermined command may include a predetermined identifier and parameter data.

Furthermore, method 400 may proceed with operation 404, where a predetermined identifier is determined within the predetermined command by the peripheral device. In one embodiment, the predetermined identifier may include a pre-defined buffer identifier within the predetermined command. For example, the predetermined identifier may include a buffer ID of the CDB.

Further still, in one embodiment, the predetermined identifier may include a value indicating a pre-defined buffer mode within the predetermined command. For example, the predetermined identifier may include a buffer mode of the CDB. In another embodiment, the predetermined identifier may include a value indicating that one or more actions (e.g., management actions, etc.) are to be implemented within the peripheral device via a predetermined communications layer.

Also, in one embodiment, the predetermined buffer ID may be the same for both read and write buffer commands. In another embodiment, the predetermined buffer ID for a read buffer command may be different from the predetermined buffer ID for a write buffer command. In yet another embodiment, the predetermined buffer ID may be one of a plurality of buffer IDs that are each associated with one or more predetermined tasks.

Additionally, method 400 may proceed with operation 406, where parameter data associated with the predetermined identifier is implemented by the peripheral device in response to the determining. In one embodiment, in response to determining the predetermined identifier, the peripheral device may determine that the predetermined command is associated with a predetermined communications layer (e.g., an abstracted communications layer, etc.). In another embodiment, the parameter data may be received by the peripheral device in association with the predetermined command.

Further, in one embodiment, the parameter data may be included as a payload within the predetermined command. In another embodiment, the parameter data may include one or more management actions to be performed within the peripheral device. For example, the parameter data may request one or more of a physical status of the peripheral device, utilization information of the peripheral device, service information of the peripheral device, etc.

Further still, in one embodiment, the parameter data may be created utilizing a representational state transfer (REST) application programming interface (API). In another embodiment, the parameter data may include arguments in an extensible markup language (XML) format, in a java script object notation (JSON) format, etc. In yet another embodiment, implementing the parameter data may include performing one or more management actions within the peripheral device (e.g., the management actions requested via the parameter data, etc.).

Also, in one embodiment, implementing the parameter data may include sending a confirmation and/or results of the one or more management actions to a computing device that sent the predetermined command. In another embodiment, the parameter data may be logged in association with the predetermined identifier (e.g., for later organization, retrieval, etc.).

In this way, management commands created utilizing a REST API may be implemented within a peripheral device utilizing an in-band interface. This may simplify the creation and implementation of such management commands, and may reduce an amount of processing required to both create such commands at a computing device and process such commands at a peripheral device, which may improve a performance of both the computing device and the peripheral device.

Figure 5:
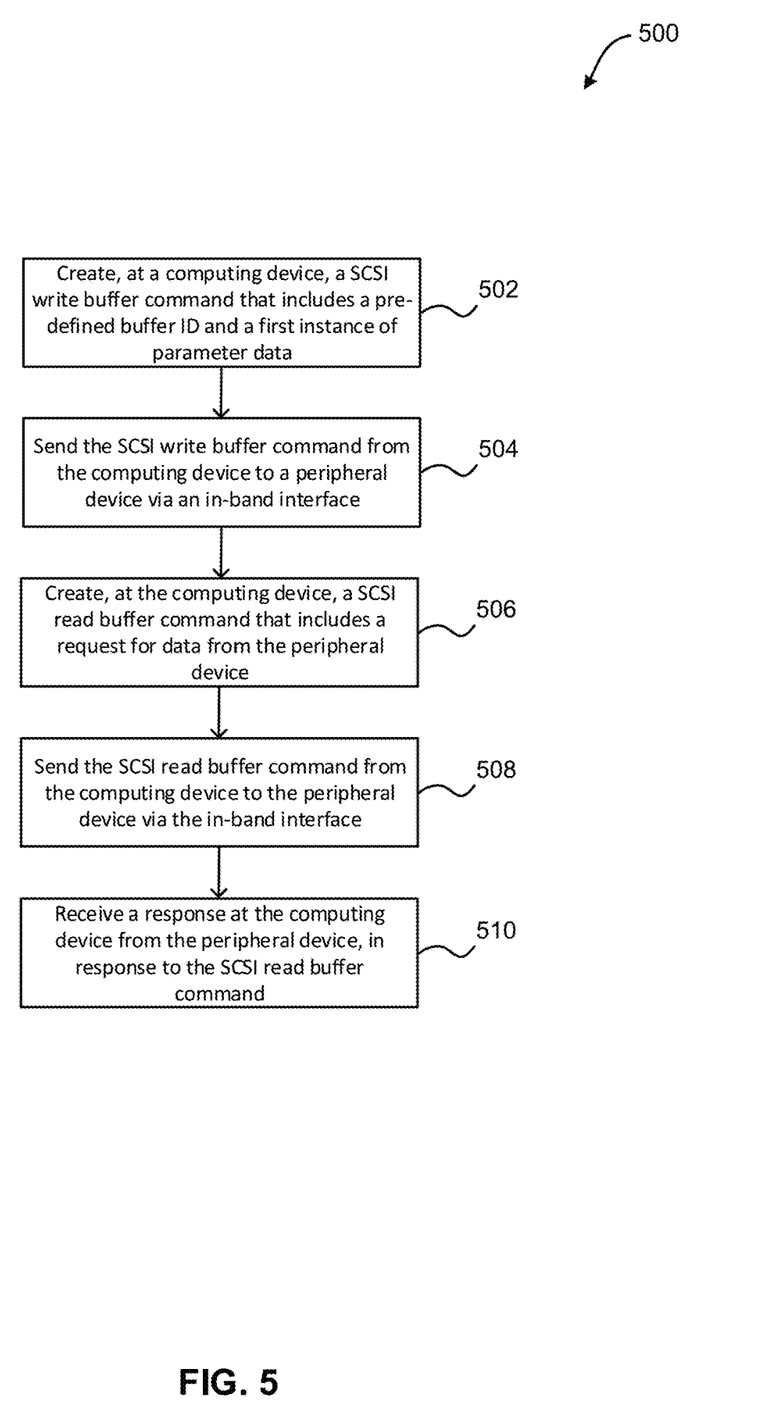
FIG. 5 illustrates a method for implementing management commands via SCSI read and write buffer commands, in accordance with one embodiment of the present invention.

Now referring to FIG. 5, a flowchart of a method 500 for implementing management commands via SCSI read and write buffer commands is shown according to one embodiment. The method 500 may be performed in accordance with the present invention in any of the environments depicted in FIGS. 1-3, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a SCSI write buffer command that includes a pre-defined buffer ID and a first instance of parameter data is created at a computing device. In one embodiment, the pre-defined buffer ID may include a value indicating that the SCSI write buffer command contains one or more management commands to be implemented at a peripheral device. In another embodiment, the first instance of parameter data may include one or more management commands created utilizing a REST API.

Additionally, method 500 may proceed with operation 504, where the SCSI write buffer command is sent from the computing device to a peripheral device via an in-band interface. In one embodiment, the in-band interface may include an interface (e.g., a fiber channel transport layer, etc.) separate from an out-of-band interface (e.g., an ethernet channel transport layer, etc.).

Further, method 500 may proceed with operation 506, where a SCSI read buffer command that includes a request for data from the peripheral device is created at the computing device. In one embodiment, the request for data may include a request for a REST API response.

Further still, method 500 may proceed with operation 508, where the SCSI read buffer command is sent from the computing device to the peripheral device via the in-band interface.

Also, method 500 may proceed with operation 510, where a response is received at the computing device from the peripheral device, in response to the SCSI read buffer command. In one embodiment, the response may include a confirmation that the one or more management commands within the first instance of parameter data were valid. For example, the response may include a REST API response. In another embodiment, the response may include information requested via the one or more management commands within the first instance of parameter data. In another embodiment, the response may be displayed by the computing device (e.g., via a display of the computing device, etc.).

In this way, a computing device may encapsulate management commands created utilizing a REST API within a SCSI write buffer command, which may be sent to a peripheral device via an in-band interface. The computing device may also encapsulate a response request within a SCSI read buffer command, which may also be sent to the peripheral device via the in-band interface. This may enable a modern peripheral device management API to be implemented over the in-band interface.

REST Over SCSI

The SCSI command set is a common API for many products (e.g., storage products, etc.). The SCSI CDBs are very rigidly structured in a pre-defined fashion, and as a result they can be difficult to program and to maintain. A SCSI command set is normally used to perform reads from and writes to a SCSI storage product and is referred to as an in-band interface. For managing a storage product, an out-of-band (OOB) interface (e.g. a GUI, CLI, or REST API) may be provided over a separate Ethernet interface. A REST API is a means for managing the resources of the storage product in a self-describing fashion that is more "programmer-friendly" than the SCSI API.

Security is an important requirement for a storage product. However, many storage product customers have much more stringent security requirements for OOB interfaces than in-band interfaces due to the way they manage these interfaces/networks (e.g., siloing of the in-band interfaces/networks). As a result, in-band management methods may be preferred over out-of-band methods; however, the SCSI API is not "programmer-friendly."

Some transport protocols like iSCSI can co-exist with the management APIs on a common Ethernet network. However, transport protocols such as SAS and Fibre Channel cannot co-exist with TCPI/IP-based management APIs. It is therefore desirable to provide a modern management API that co-exists with SCSI commands over non-Ethernet transport protocols.

In one embodiment, REST may be implemented over SCSI. REST is a command/response method built around the http standard, where responses to queries are provided in a self-describing fashion, often using xml or JSON data structures. In one embodiment, SCSI Write Buffer and SCSI Read Buffer commands may be used to carry a REST API payload that would normally be transferred over TCP/IP.

In one embodiment, the SCSI Write/Read Buffer commands require that a pre-defined buffer ID be specified for a specific purpose. In this case, a single buffer ID may be defined (or a pair of buffer IDs, one for the REST command and one for the response), for which many different REST commands could then be encapsulated.

For example, the SCSI Write Buffer command may send a buffer of data that includes ASCII text complying with the REST API syntax, as follows:

GET Tasks/1098711043

The SCSI Read Buffer command may then be used to retrieve the ASCII text response to that request, where an exemplary response is shown in Table 1.

TABLE 1

```
HTTP/1.1 200 OK
Content-Type: text/json
Content-Length: 231
{ID=1098711043,type="inventoryTier0and1",location="frame_2",state="inProgress",st
artTime="2018-09-17T23:02:00-0700",lastUpdateTime="2018-09-17T23:02:10-
0700",percentComplete=68,duration=60000,user="admin",description="",volser=""}
```

In another embodiment, a series of SCSI Write Buffer and Read Buffer commands could include parameter data used for starting a task and then suggesting the next REST command to poll for completion.

For example, Table 2 illustrates exemplary parameter data contents of a write buffer to start a new task.

TABLE 2

```
POST tasks
Content-Type: text/html
Content-Length: 44
type="inventoryTier0and1",location="frame_F2"
```

Table 3 illustrates exemplary contents of a read buffer response that suggests a next command for polling.

TABLE 3

```
HTTP/1.1 200 OK
Content-Type: text/html
Content-Length: 13
GET tasks/1098711043
```

Table 4 illustrates exemplary parameter data contents of a write buffer to perform polling.

TABLE 4

```
GET tasks/1098711043
```

Table 5 illustrates exemplary contents of a read buffer polling response.

TABLE 5

```
HTTP/1.1 200 OK
Content-Type: text/json
Content-Length: 231
{ID=1098711043,type="inventoryTier0and1",location="frame_2",state="inProgress",s
tartTime="2018-09-17T23:02:00-0700",lastUpdateTime="2018-09-17T23:02:10-
0700",percentComplete=68,duration=60000,user="admin",description="",volser=""}
```

In one embodiment, the buffer IDs may include a single buffer ID, a command/response pair of buffer IDs, or a series of buffer IDs to provide additional input options (e.g., a viewable history of a last predetermined number of commands, asymmetric access, identities of requested resources, etc.).

Additionally, in one embodiment, the one or more write and read buffer commands are in American Standard Code Information Interchange (ASCII) text.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, at a data storage device, a SCSI write buffer command;
   identifying within the SCSI write buffer command, by the data storage device:
      a predetermined identifier indicating that one or more management actions are to be performed within the data storage device, and
      parameter data including the one or more management actions;
   performing, within the data storage device, the one or more management actions;
   receiving, at the data storage device, a SCSI read buffer command that includes a request for a REST API response; and
   sending, by the data storage device, the REST API response.

2. The computer-implemented method of claim 1, wherein the one or more management actions include a request for information from the data storage device.

3. The computer-implemented method of claim 1, wherein:
   the SCSI write buffer command is in ASCII text,
   the SCSI write buffer command is received by the data storage device as a command descriptor block (CDB), and
   the parameter data includes a request for a physical status of the data storage device.

4. The computer-implemented method of claim 1, further comprising sending a confirmation and results of the one or more management actions to a computing device; wherein:
   the SCSI write buffer command is in ASCII text,
   the parameter data includes arguments in an extensible markup language (XML) format.

5. The computer-implemented method of claim 1, wherein:
   the data storage device includes a hard disk drive.

6. The computer-implemented method of claim 1, wherein:
   the SCSI write buffer command is in ASCII text,
   the parameter data includes arguments in an extensible markup language (XML) format,
   the predetermined identifier includes a pre-defined buffer identifier within the SCSI write buffer command, and
   the parameter data includes a request for service information of the data storage device.

7. The computer-implemented method of claim 1, wherein the REST API response is sent by the data storage device to a computing device that sent the SCSI write buffer command and the SCSI read buffer command.

8. The computer-implemented method of claim 1, wherein the SCSI write buffer command is received by the data storage device as a command descriptor block (CDB).

9. The computer-implemented method of claim 1, wherein the parameter data includes:
   a request for a physical status of the data storage device,
   a request for utilization information of the data storage device, and
   a request for service information of the data storage device.

10. The computer-implemented method of claim 1, wherein in response to determining the predetermined identifier, the data storage device determines that the SCSI write buffer command is associated with an abstracted communications layer.

11. The computer-implemented method of claim 1, wherein the parameter data is included as a payload within the SCSI write buffer command.

12. The computer-implemented method of claim 1, comprising sending a confirmation and results of the one or more management actions to a computing device; wherein:
   the SCSI write buffer command is in ASCII text,
   the parameter data includes arguments in a java script object notation (JSON) format.

13. The computer-implemented method of claim 1, wherein:
   the SCSI write buffer command is received via an in-band interface utilizing a small computer system interface (SCSI) command set, and
   the in-band interface utilizes a first port of the data storage device, and an out-of-band interface utilizes a second port of the data storage device that is separate from the first port.

14. The computer-implemented method of claim 1, wherein the parameter data includes a request for a physical status of the data storage device.

15. The computer-implemented method of claim 1, comprising sending a confirmation and results of the one or more management actions to a computing device that sent the SCSI write buffer command.

16. The computer-implemented method of claim 1, wherein:
   the SCSI write buffer command is received by the data storage device as a command descriptor block (CDB),
   the predetermined identifier includes a buffer ID of the CDB that indicates a buffer mode of the CDB,
   in response to determining the predetermined identifier, the data storage device determines that the SCSI write buffer command is associated with an abstracted communications layer, and
   the parameter data is included as a payload within the SCSI write buffer command.

17. A computer program product comprising one or more computer readable storage media, and program instructions collectively stored on the one or more computer readable storage media, the program instructions comprising instructions configured to cause one or more processors to perform a method comprising:
   receiving, utilizing the one or more processors at a data storage device, a SCSI write buffer command;
   identifying within the SCSI write buffer command, by the data storage device utilizing the one or more processors:
      a predetermined identifier indicating that one or more management actions are to be performed within the data storage device, and parameter data including the one or more management actions; performing, within the data storage device utilizing the one or more processors, the one or more management actions;

receiving, utilizing the one or more processors at the data storage device, a SCSI read buffer command that includes a request for a REST API response; and sending, utilizing the one or more processors at the data storage device, the REST API response.

18. The computer program product of claim 17, wherein the SCSI write buffer command is received from a computing device separate from the data storage device.

19. The computer-implemented method of claim 1, wherein the data storage device includes a solid state drive.

20. A system, comprising:

a processor; and logic integrated with the processor, executable by the processor, or integrated with and executable by the processor, the logic being configured to:

receive, at a data storage device, a SCSI write buffer command;

identify within the SCSI write buffer command, by the data storage device:

a predetermined identifier indicating that one or more management actions are to be performed within the data storage device, and parameter data including the one or more management actions;

perform, within the data storage device, the one or more management actions;

receive, at the data storage device, a SCSI read buffer command that includes a request for a REST API response; and send, by the data storage device, the REST API response.

* * * * *